US009849925B2

(12) United States Patent
Outa et al.

(10) Patent No.: US 9,849,925 B2
(45) Date of Patent: Dec. 26, 2017

(54) HINGED VEHICLE CHASSIS

(71) Applicant: Saudi Arabian Oil Company, Dhahran (SA)

(72) Inventors: Ali Outa, Thuwal (SA); Pablo Carrasco Zanini, Thuwal (SA); Fadl Abdellatif, Thuwal (SA); Brian Parrott, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 15/137,168

(22) Filed: Apr. 25, 2016

(65) Prior Publication Data

US 2016/0311476 A1 Oct. 27, 2016

Related U.S. Application Data

(63) Continuation of application No. 14/553,862, filed on Nov. 25, 2014, now Pat. No. 9,321,306.

(Continued)

(51) Int. Cl.
*B62D 39/00* (2006.01)
*B60B 19/12* (2006.01)
(Continued)

(52) U.S. Cl.
CPC ............ *B62D 39/00* (2013.01); *B60B 19/003* (2013.01); *B60B 19/006* (2013.01); *B60B 19/12* (2013.01);
(Continued)

(58) Field of Classification Search
CPC ..... B60B 19/003; B60B 19/12; B60B 19/006; B62D 63/04; B62D 61/00; B62D 57/00; B62D 53/02; B62D 39/00; F16L 55/26
See application file for complete search history.

(56) References Cited

U.S. PATENT DOCUMENTS

| 3,465,843 | A | 9/1969 | Guinot |
| 3,872,940 | A | 3/1975 | Gambini |

(Continued)

FOREIGN PATENT DOCUMENTS

| CN | 102673673 A | 9/2012 |
| CN | 202624434 U | 12/2012 |

(Continued)

OTHER PUBLICATIONS

"Honda UNI-CUB Personal Mobility Device" YouTube video, 3:31, posted by "Honda," May 14, 2012, <www.youtube.com/watch?v=_Me1P0JljVk>.

(Continued)

*Primary Examiner* — Drew J Brown
(74) *Attorney, Agent, or Firm* — Leason Ellis LLP

(57) ABSTRACT

A robotic vehicle chassis is provided. The robotic vehicle chassis includes a first chassis section, a second chassis section, and a hinge joint connecting the first and second chassis sections such that the first and second chassis sections are capable of rotation with respect to each other in at least a first direction. The vehicle includes a drive wheel mounted to one of the first and second chassis sections and an omni-wheel mounted to the other of the first and second chassis sections. The omni-wheel is mounted at an angle orthogonal with respect to the drive wheel. The hinge joint rotates in response to the curvature of a surface the vehicle is traversing.

14 Claims, 5 Drawing Sheets

Related U.S. Application Data

Figure 1:
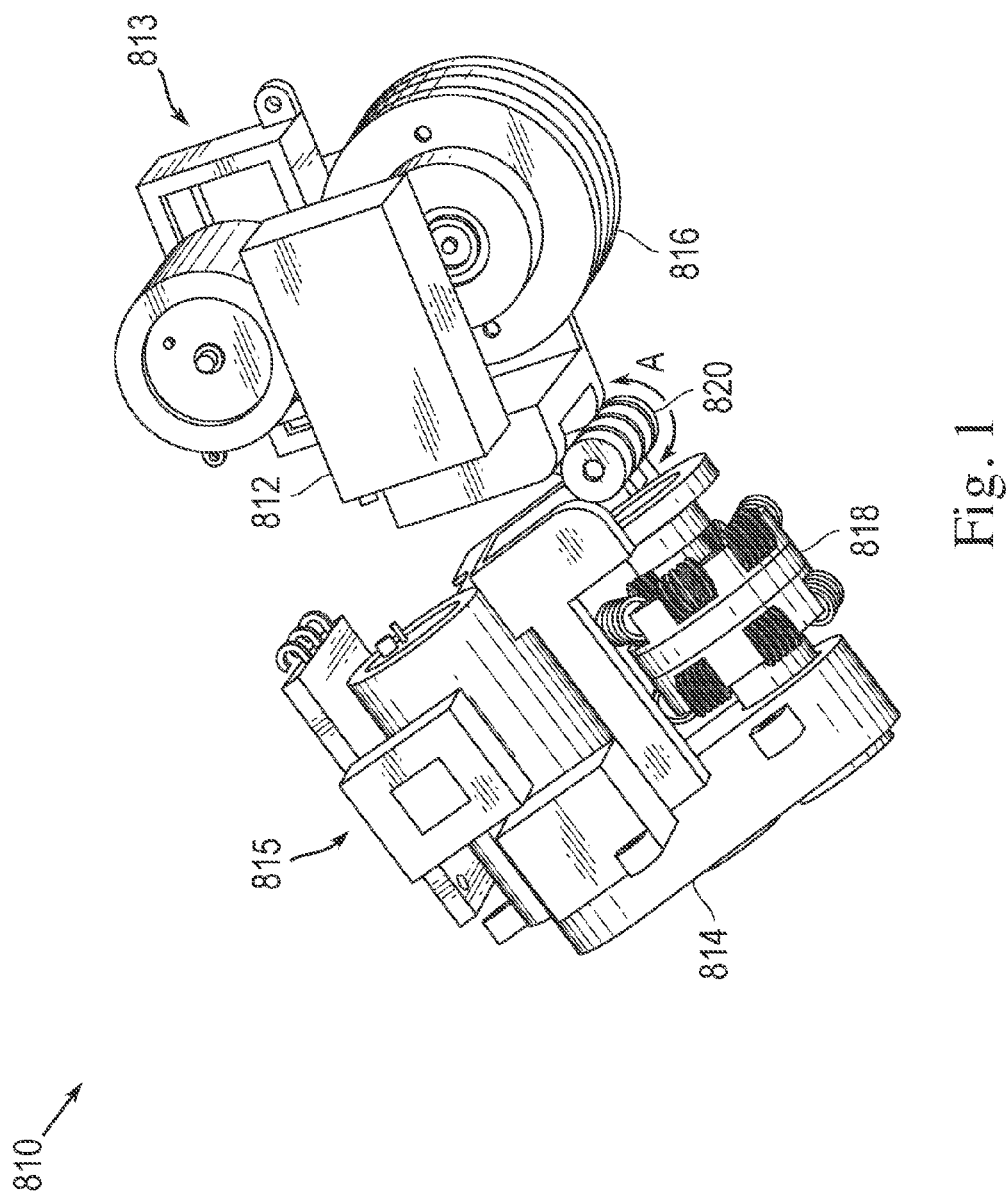

(60) Provisional application No. 61/910,323, filed on Nov. 30, 2013.

(51) Int. Cl.

| | | |
|---|---|---|
| *B62D 53/02* | (2006.01) | |
| *B62D 57/00* | (2006.01) | |
| *B60B 19/00* | (2006.01) | |
| *B62D 61/00* | (2006.01) | |
| *B62D 63/04* | (2006.01) | |
| *F16L 101/30* | (2006.01) | |

(52) U.S. Cl.
CPC ............. *B62D 53/02* (2013.01); *B62D 57/00* (2013.01); *B62D 61/00* (2013.01); *B62D 63/04* (2013.01); *F16L 2101/30* (2013.01)

(56) References Cited

U.S. PATENT DOCUMENTS

| | | | |
|---|---|---|---|
| 4,715,460 A * | 12/1987 | Smith | A61G 5/046 180/210 |
| 4,722,001 A | 1/1988 | Rohrich et al. | |
| 5,375,530 A * | 12/1994 | Zollinger | F16L 55/26 104/138.1 |
| 5,423,230 A * | 6/1995 | Olander | H04N 7/185 348/E7.088 |
| 6,315,109 B1 * | 11/2001 | Dean | B60P 1/02 193/35 MD |
| 8,605,145 B2 * | 12/2013 | Webster | F22B 37/002 15/3 |
| 2008/0295595 A1 | 12/2008 | Tacklind et al. | |
| 2011/0169938 A1 | 7/2011 | Webster et al. | |
| 2013/0024067 A1 * | 1/2013 | Troy | B25J 5/007 701/36 |
| 2013/0140801 A1 | 6/2013 | Schlee et al. | |
| 2014/0278221 A1 * | 9/2014 | Troy | G01C 22/02 702/151 |
| 2015/0151572 A1 * | 6/2015 | Parrott | B60B 19/12 301/5.23 |
| 2015/0153170 A1 * | 6/2015 | Gonzalez | G01B 21/22 701/300 |
| 2015/0153312 A1 * | 6/2015 | Gonzalez | G01D 5/00 73/23.2 |

FOREIGN PATENT DOCUMENTS

| | | |
|---|---|---|
| EP | 2 197 731 | 6/2010 |
| JP | S54 131209 | 10/1979 |
| JP | S62 268782 | 11/1987 |
| JP | 02-120168 | 5/1990 |
| KR | 20120118070 A | 10/2012 |
| WO | WO 01/79007 | 10/2001 |
| WO | WO 2014/076806 | 5/2014 |

OTHER PUBLICATIONS

"Using a Rotacaster Omni-wheel as a Steering Jockey-Wheel for Lego NXT," YouTube video, 2:28, posted by "Sparra McNamara," Sep. 21, 2010, <www.youtube.com/watch?v=gWDmUmGJxyE>.
"Hydroblasting Robot." Mechanical Equipment—Hydroblasting Robot. 2009. Web. <www.ahilios.gr/en/mechanical-equipment/hydroblasting-robot.html>.
"ROCR is an Oscillating Climbing Robot." ClimbingRobots: ROCR. May 13, 2012. Web. <heml.eng.utah.edu/index.php/ClimbingRobots/ROCR>. pp. 1-5.
Lee, Seung-heui, et. al. "Recognition of Corrosion State Based on Omnidirectional Mobile Robot for Inspection of CAS for Oil Tanker". Annual Conference 2008. Aug. 20-22, 2008, The University Electro-Communications, Japan.
Oddbot. "Service Droid—The Build". Service Droid—The Build Let's Make Robots. Sep. 7, 2013. Web. Oct. 4, 2013. pp. 1-7. <letsmakerobots.com/node/38376?page=1>.
"HR-MP5 Features." Light Weight Magnetic Climbing Robot. Web. 2010-2014.
Tâche, Fabien, et al. "Adapted Magnetic Wheel Unit for Compact Robots Inspecting Complex Shaped Pipe Structures." Advanced intelligent mechatronics, 2007 IEEE/ASME international conference. pp. 1-6.
Tâche, Fabien, et al. "Compact Magnetic Wheeled Robot With High Mobility for Inspecting Complex Shaped Pipe Structures" pp. 1-6. Prior to Nov. 30, 2013.
Tâche, Fabien, et al. "Magnebike: A Magnetic Wheeled Robot With High Mobility for Inspecting Complex Shaped Structures". Article first published online: Mar. 6, 2009. pp. 1-33.
"Advanced Environmental Technologies."—Robotics and Inspection Services. 2008. Web. Sep. 24, 2014. <www.aettopgun.com/pipe.html>. p. 1 of 1.
"Internal Inspection of Small Pipes; PIPETRON". HiBot Corporation. Grren Innovations Jetro Partnerships. 2005-2012.
"Stainless Steel V-Groove Wheel Casters W-313-SVB-1/2." Hamilton. Web. Sep. 23, 2014. <www.hamiltoncaster.com/Casters/Stainless_Steel_Casters/Stainles>. pp. 1-2.
"V Groove Caster Wheels." Caster City. Web. Sep. 23, 2014. <www.castercity.com/vgroovew.htm>. pp. 1-3.
"Pipe Handling Conveyors." Cisco-Eagle. Web. Sep. 23, 2014. <www.cisco-eagle.com/catalog/c-3278-pipe-handling-conveyor.aspx>. pp. 1-4.
"Solid Polymer Converyor Rollers." Power-Core. Web. Sep. 23, 2014. <www.intechpower.com/products/solid-polymer-conveyor-rollers-/>. pp. 1-2.
"CamOnWheels." CamOnWheels RSS. Web. Sep. 23, 2014. <www.camonwheels.com/>. pp. 1-2.
"Pipe Wheels." DH Casters Wheels. Web. Sep. 23, 2014. <www.dhcasters.com/pipe-wheels-p-1032-1-en.html>. pp. 1-2.
Zanini, Pablo Carrasco, "Comparative Survey of Climbing Robot Mechanisms for Vessel and Tank Inspection", 6th Middle East NDT Conference & Exhibition 2012—[Oct. 7-10, 2012, Kingdom of Bahrain], pp. 1-8.
"SERBOT AG—Solar Panel Cleaning and Facade Cleaning Systems." SERBOT Swiss Innovations, Copyright 2015. Web. <www.serbot.ch/index.php/en/>.
"Shady." DRL. N.p., Aug. 19, 2010. Web. <groups.csail.mit.edu/drl/wiki/index.php?title=Shady#Linkage-Based_Grip_Mechanism>.
Yi, Zhengyao et al., "Development of a wall climbing robot for ship rust removal", Mechatronics and Automation, ICMA Aug. 2009. International Conference. Abstract.
Luk, Bing L. et al., "Intelligent Legged Climbing Service Robot for Remote Maintenance Applications in Hazardous Environments", Robotics and Autonomous Systems, vol. 53, Issue 2, Nov. 30, 2005. pp. 1-14.
Hillenbrand, C., D. Schmidt, and K. Berns. "Cromsci: Climbing Robot with Multiple Sucking Chambers for Inspection Tasks." CROMSCI. Jun. 18, 2008. Web. <agrosy.informatik.uni-kl.de/en/robots/cromsci/>. pp. 1-8.
ECOVACS "An robotic window cleaner for your needs." Copyright 2012. Web. <www.ecovacs.com.cn/Winbot/home.htm>.
"CCNY Robotics Professor Receives NSF Commercialization Grant." CCNY Robotics Professor Receives NSF Commercialization Grant. The City College of New York, Apr. 4, 2012. Web. <www.ccny.cuny.edu/news/CCNY-Robotics-Professor-Receives-NSF-Commercialization-Grant.cfm>.

* cited by examiner

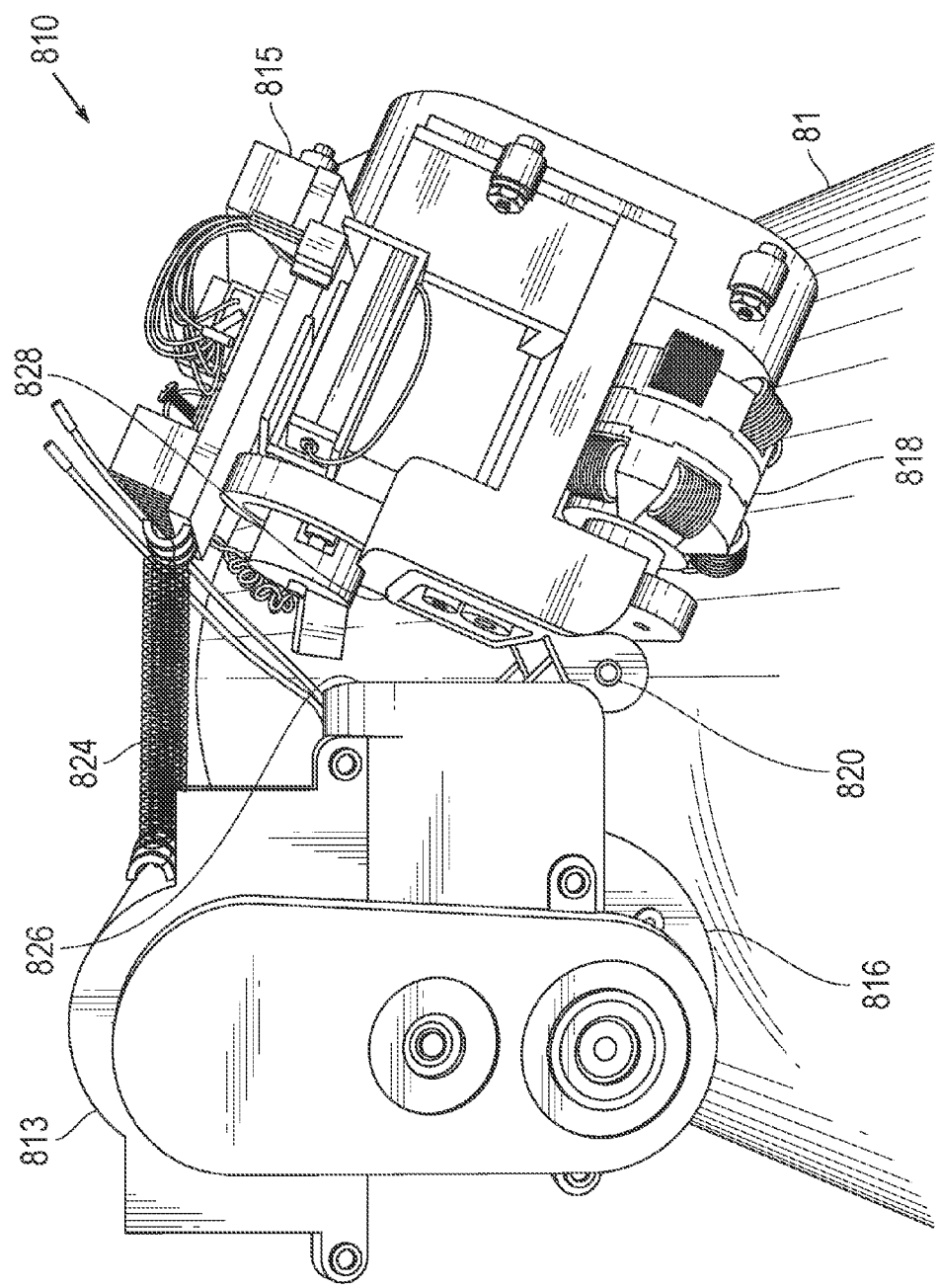

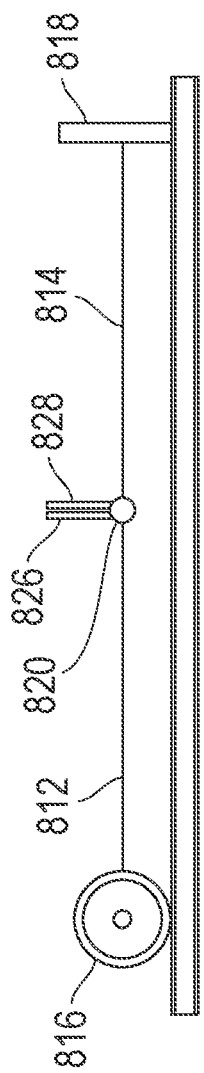

HINGED VEHICLE CHASSIS

CROSS-REFERENCE TO RELATED APPLICATIONS

This application is based on and claims priority to U.S. Provisional Patent Application Ser. No. 61/910,323, filed on Nov. 30, 2013, which is hereby incorporated by reference as if set forth in its entirety herein.

FIELD OF THE INVENTION

The present invention relates to vehicles and, in particular, robotic inspection vehicles.

BACKGROUND

In the past, there have been different inspection vehicle designs that are used to inspect various structures, such as factory equipment, ships, underwater platforms, pipelines and storage tanks. If a suitable inspection vehicle is not available to inspect the structure, an alternative is to build scaffolding that will allow people access to inspect these structures, but at great cost and danger to the physical safety of the inspectors. Past inspection vehicles have lacked the control necessary to inspect such surfaces effectively. There are different ways of controlling and providing translational forces to vehicles, however, many of these systems are designed for gravity-dependent transport, whether the goal is to overcome gravity or simply use it.

The present invention provides a solution for providing vehicular movement in non-gravity-dependent operations, where the impact of gravity on vehicle movement can be minimized while still enabling versatile control. As well, the present invention is capable of effectively navigating a variety of curved surfaces such as pipes and vessels, as this is one possible use of the invention.

SUMMARY

According to an aspect of the present invention, a robotic vehicle chassis is provided. The vehicle chassis includes a first chassis section, a second chassis section, and a hinge joint connecting the first and second chassis sections such that the first and second chassis sections are capable of rotation with respect to each other in at least a first direction. The vehicle includes a drive wheel mounted to one of the first and second chassis sections and an omni-wheel mounted to the other of the first and second chassis sections. The omni-wheel is mounted at an angle orthogonal with respect to the drive wheel. The vehicle includes at least a first magnet connected to at least the drive wheel or the chassis section to which the drive wheel is mounted and at least a second magnet connected to at least the omni-wheel or the chassis section to which the omni-wheel is mounted. The at least first and second magnets maintain and attractive force between the first chassis section and the surface and the second chassis section and the surface, respectively, wherein the surface is ferromagnetic. The hinge joint of the vehicle rotates in response to the curvature of a surface the vehicle is traversing.

According to a further aspect, the robotic vehicle chassis further comprises a spring element extending between the first and second chassis section, the spring element providing a force that urges the first and second chassis sections into a normal position in which there is a zero degree of rotation between the first and second chassis sections.

According to a further aspect, the first and second chassis sections include separate power sources and motors for driving the drive wheel and the omni-wheel separately.

According to a further aspect, the omni-wheel includes a first and second set of rollers wherein the rollers maintain at least two points of contact with the surface.

According to a further aspect, the first and second set of rollers are supported by a first and second hub, respectively, where the first and second hubs are configured to rotate freely with respect to each other.

According to a further aspect, the drive wheel includes a first and second drive hub, wherein the first and second drive hubs are configured to selectively rotate freely with respect to each other.

According to a further aspect, the contact surfaces of the drive hubs are curved such that each side of the driving wheel contacts the surface at a single point.

According to a further aspect, the points of contact of the drive hubs are textured.

According to a further aspect, the points of contact of the drive hubs are knurled.

According to a further aspect, the points of contact of the drive hubs are coated.

According to a further aspect, the points of contact of the drive hubs have a rubber coating.

According to a further aspect, the points of contact of the drive hubs have a polyurethane coating.

According to a further aspect, a single power source provides power to the first and second chassis sections and motors for driving the drive wheel and the omni-wheel.

BRIEF DESCRIPTION OF THE DRAWING FIGURES

Figure 2:
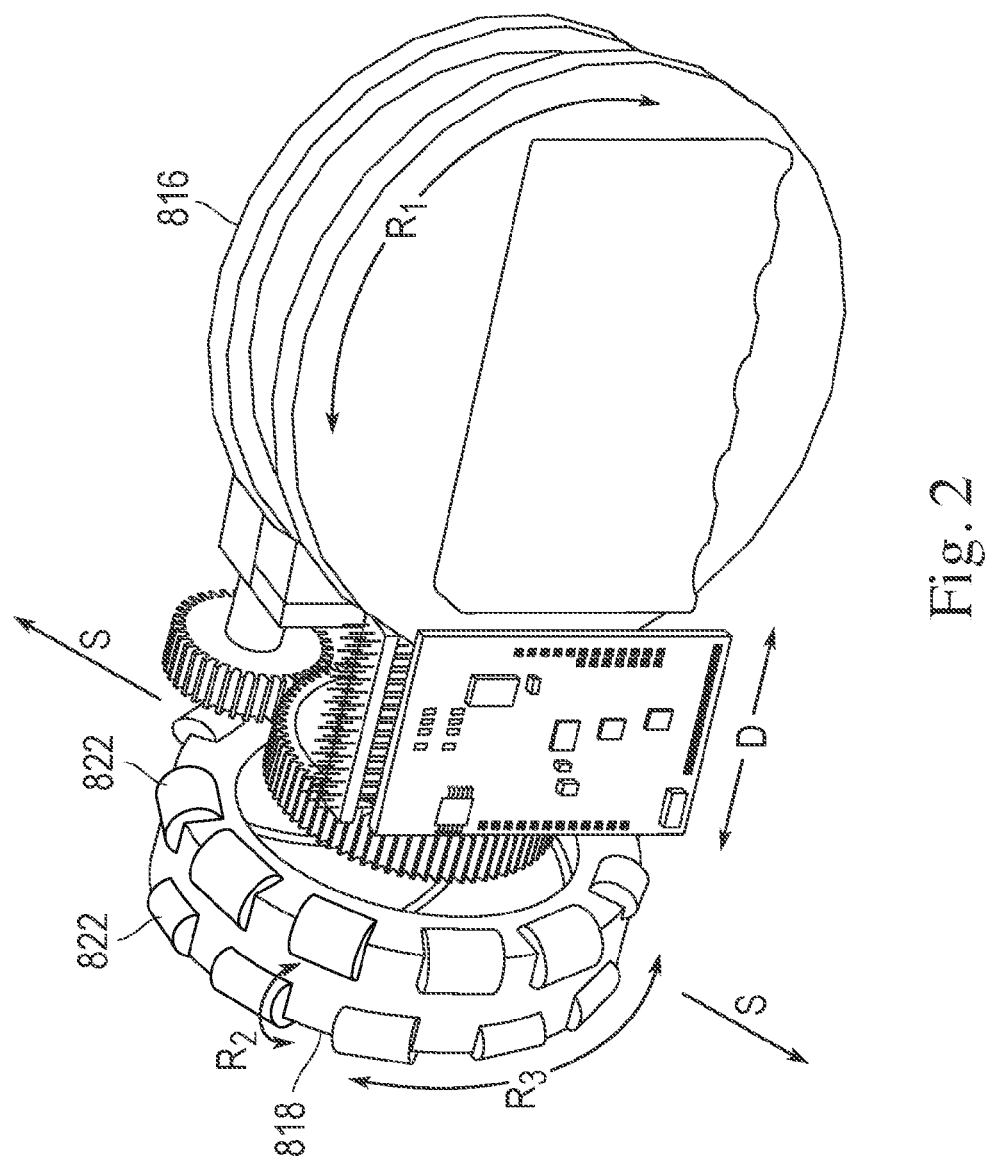
Figure 4A:
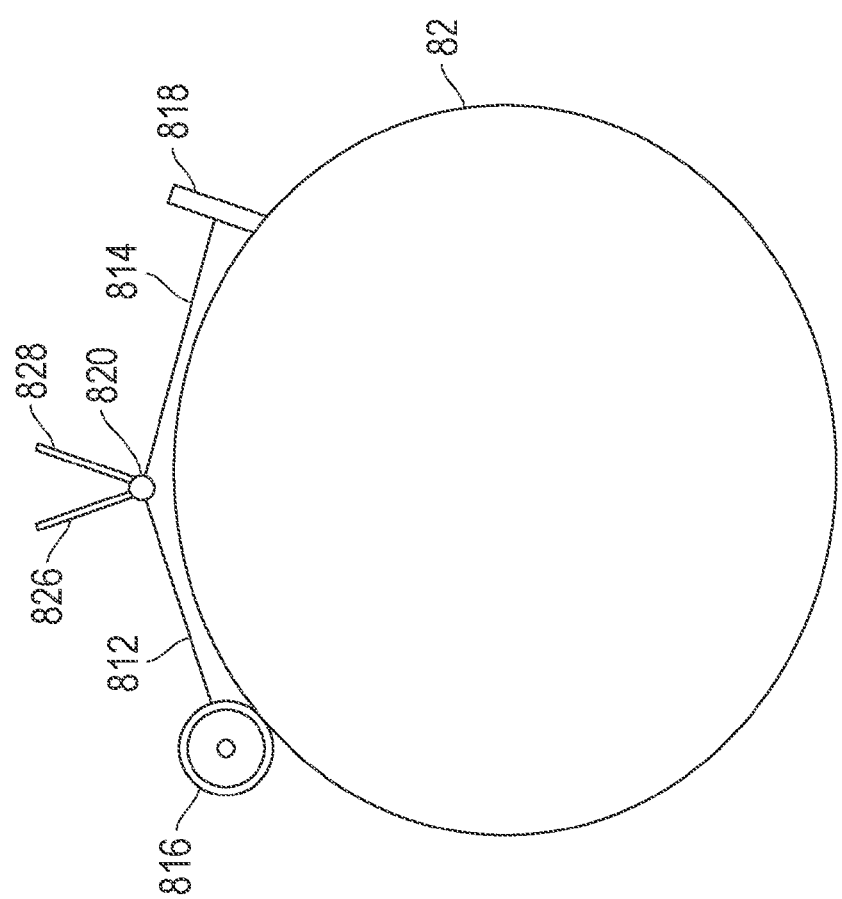

FIG. 1 illustrates a vehicle having a hinged chassis;
FIG. 2 illustrates additional features of a vehicle;
FIG. 3 illustrates a vehicle having a hinged chassis on a curved surface;
FIG. 4A illustrates a schematic of a vehicle having a hinged chassis on a curved surface; and
FIG. 4B illustrates a schematic of a vehicle having a hinged chassis on a flat surface.

DETAILED DESCRIPTION OF CERTAIN EMBODIMENTS

Referring to FIG. 1, a robotic vehicle 810 in accordance with an embodiment of the invention is shown. The robotic vehicle 810 includes a first chassis section 812 and a second chassis section 814. A drive wheel 816 is connected to the first chassis section 812 and an omni-wheel 818 is connected to the second chassis section 814. Each chassis section can include a control module 813, 815. Each control module can include a motor, drive assembly for transferring mechanical power from the motor to the wheels, a power source (e.g., battery), and a controller that can control the operation of the vehicle by processing sensed data, processing stored instructions, and/or processing control instruction/signals received from a remote computer/operator. The control modules 813, 815 can also be connected by a flexible cable so that power and control instructions can be shared between the two modules.

The first and second chassis sections are connected together via a connection that provides a degree of freedom between the two chassis sections, such as a hinge 820. The hinge 820 can by of several different types, including a knuckle/pin hinge or ball and detent hinge, for example.

Other types of structures can be used to provide a degree of freedom between the two chassis sections. For example, a flexible material (e.g., flexible plastic) can be used to connect the two chassis sections together while providing the degree of freedom between the two chassis sections. The hinge 820 provides a degree of freedom of movement between the first and second chassis sections. In particular, chassis sections 812, 814 are rotatable through a range of degrees, with respect to each other as indicated by arrow "A" about the hinge 820. As discussed in more detail below, the range of degrees of rotation between the first and second chassis sections 812, 814 provides flexibility of movement for the vehicle 810 to traverse curved surfaces while the drive wheel 816 and omni-wheel 818 remain in contact with and normal to the curved surface. The hinge can also have some play in the connection that permits a limited degree of side-to-side movement. The play can be a result of a loose fit between the joints of the hinge or the material used (e.g., plastic that permits some twisting). The play can permit the chassis sections to slightly move side-to-side and/or twist. This play can improve the function of the robot as it moves along particular trajectories that induce a twisting motion between the two chassis sections, such as when the vehicle is traveling in a helical pattern around a pipe.

Referring now to FIG. 2, a simplified sketch shows the orientation of the drive wheel 816 and the omni-wheel 818, without illustrating the hinged chassis. In the robotic vehicle's preferred direction of travel, which is indicated by arrow "D," the drive wheel 816 of the robotic vehicle 810 rotates about its access in a direction indicated by arrow "R1" in response to a motor that propels the vehicle forward. The axis of rotation of the omni-wheel 818 is nominally oriented perpendicular to the drive wheel 816 (and the wheels are in orthogonal planes), as shown in FIG. 2. The omni-wheel 818 includes a plurality of rollers 822 that are located around the periphery of the omni-wheel 818. The rollers 822 are mounted on the omni-wheel 818 (via pins or axles, for example) for rotation in the same direction as the drive wheel 816, as indicated by arrow "R2" (i.e., R1 is the same direction as R2). Accordingly, when the drive wheel 816 is driven, the omni-wheel 818 can serve as a follower wheel that is not driven. The rollers 822 passively rotate as the drive wheel 816 is driven, thereby allowing the vehicle to travel in the driven direction as indicated by arrow "D" with the rollers serving the purpose of reducing the friction of the passive omni-wheel 818, at least that is the result when the vehicle 810 is moving along a level surface.

The drive wheel 816 can have a single hub or yoke or can have two hubs or yokes ("drive hubs"). The two drive hubs can be arranged to rotate together or they can be arranged so that they can rotate with respect to each other. Allowing one of the drive hubs of the driving wheel to rotate freely is useful when pivoting in place. Such an arrangement allows rotation about truly a single point rather than the center of the driving wheel. This arrangement can also preventing the driving wheel from damaging the surface as it slides through the rotation. The driving wheel can also have curved (and/or textured or coated) points of contact (rim of each hub) such that each side of the driving wheel contacts the surface in just one point regardless of the curvature. As one example, the rim can be knurled to provide texture. As another example, the rim can be coated with rubber or polyurethane. Such an arrangement can improve the consistency of pull force and friction and can also improve the performance of the chassis and reduce the power consumption on the steering wheel when pivoting. The drive wheel can include magnets when adhesion to a ferromagnetic surface is required.

The omni-wheel can include two sets of rollers 822 provided around the periphery of the wheel and located on each side of the omni-wheel as shown in FIG. 2. The omni-wheel 818 can have two hubs or yokes in which a set of rollers 822 is provided on each hub. The two hubs can rotate together or the two hubs can rotate with respect to each other. An omni-wheel that includes two sets of rollers permits the omni-wheel to remain normal to the surface as the vehicle maneuvers. This structural arrangement allows the vehicle to be a fully defined structure with increased stability, and it increases pull force and traction as the wheel steers. The use of two sets of rollers results in the omni-wheel having at least two points of contact with the surface. Since the omni-wheel is mounted orthogonal to the driving wheel, the distance between each point of contact and the driving wheel is different. The steering wheel could also include a ball caster to maintain the steering normal to the surface. The omni-wheel can include magnets when adhesion to a ferromagnetic surface is required.

The omni-wheel 818 provides steering, or rotation, to control the robotic vehicle 810. The vehicle 810 can be steered by driving the omni-wheel 818 using the motor mentioned above, or a second motor (neither separately shown) by using conventional linkages between the omni-wheel and the motor. The omni-wheel rotates in a direction indicated by arrow "R3". Rotation of the omni-wheel causes the vehicle to turn or steer in a direction indicated by arrows "S". Controlling the rotation of the omni-wheel 818 allows for steering of the vehicle 810. The hinge 820 is constructed to have minimal to no yield as the omni-wheel is driven in the "S" directions so that the vehicle can be rotated in the direction "S" without the vehicle folding upon itself and so that movement in the "S" direction of the omni-wheel 818 can be correlated with a re-orientation of the drive wheel 816 as a result of the movement transferred to the drive wheel through the hinge 820.

Accordingly, the drive wheel 816 can be controlled to provide forward and rearward movement of the vehicle while the omni-wheel 818 is either a passive, low resistance follower wheel or serving as an active, steering mechanism for the vehicle. The wheels 816, 818 can be activated and driven separately or at the same time to effect different types of steering of the vehicle 810.

The configuration of the wheels of the vehicle provide for excellent mobility and stability while maintaining a relatively small foot print. This permits the robot to fit into small areas and have maneuverability that would be difficult, if not impossible, to achieve with traditional arrangements such as four wheeled vehicles. For example, a vehicle having the described arrangement can be constructed so that it can be effective on surfaces ranging from 8 inches in diameter to completely flat surfaces. The drive wheel 816 provides stability to the vehicle. In particular, the drive wheel can include a strong magnet which creates a pull force between the wheel and a ferromagnetic surface on which the vehicle 810 can be moved, and this structural arrangement assists in resisting tipping of the vehicle. In addition, the drive wheel can have a relatively wide and flat configuration, which further provides stability to the vehicle.

Referring to FIG. 3, the vehicle 810 is shown traversing a curved ferromagnetic surface 1, which, by way of example only, can be a steel pipe. The drive wheel 816 and the omni-wheel 818 can each include a magnet. For example, a magnet can be included in the hub of each of these wheels, or in the case of a double omni-wheel, (as shown, in FIG. 3) between the two hubs. By connecting the drive wheel and the omni-wheel to respective chassis sections, each chassis section is attracted (via the magnets in the wheels) to the ferromagnetic/magnetically inducible material surface (e.g., a material that generates an attractive force in the presence of a magnetic field, such as a steel pipe). Alternatively, or in addition, the chassis sections themselves could include magnets that provided attractive force between each chassis section and the ferromagnetic surface. As such, when the vehicle traverses a curved or uneven surface, each of the chassis sections can be magnetically attracted to the surface. Meanwhile, the hinge 820 enables the chassis sections to rotate relative to one another. By this arrangement, the drive wheel 816 and the omni-wheel 18 maintain contact with and normal to the surface along which the vehicle 810 is traveling. A spring 824 can also extend between the two chassis sections 812, 814 and be connected so as to provide an urging force to assist the sections back to the a position in which the two wheels are located on the same planar surface with approximately zero degrees of rotation between the two chassis sections.

Referring now to FIGS. 4A and 4B, a schematic of the robotic vehicle on a curved surface and on a flat, planar surface are shown, respectively. As shown in FIG. 4A, the chassis sections rotate about the hinge 820 so that the wheels maintain contact with the curved surface 2 on which the vehicle is traveling. Accordingly, the hinge is positioned such that it allows the steering wheel to adjust to the curvature while preventing the rest of the chassis from touching. Without the hinge 820, the chassis would remain in a straight line configuration and one of the wheels could fail to maintain contact the curved surface, or may only be in partial contact with the curved surface (e.g, only an edge of a wheel may maintain contact). Failure of one or two of the wheels to maintain contact with the traveling surface can have significant consequences. First, parts of the wheel such as the perimeter edges can come into contact with the surface which can introduce drag and wear on the parts as the vehicle continues along the surface. Second, that failure can result in a significant drop in the attractive force between the magnets of the chassis and surface. This could have a catastrophic consequence, such as when the vehicle is traversing a vertical or inverted surface, in which the vehicle fails to maintain magnetic purchase with the surface and actually decouples from the surface. Decoupling of the vehicle can result in damage to the vehicle suffered as a result of the fall, present a danger to workers in the area, and/or could result in the vehicle becoming stuck, which could present further problems. In addition, the hinge and chassis can be arranged to maintain a low center of mass of the vehicle.

As shown in FIG. 4B, the vehicle 810 is disposed on a flat surface 3. The hinge 820 can include rotation stops 826 and 828. These can be mating surfaces on each of the first and second chassis sections for example. The rotations stops can be positioned to prevent undesired rotation about the hinge 820, or to limit rotation to a set range of degrees, such as when the vehicle is on a flat surface. For example, the hinges can prevent the vehicle from folding upon itself when on a flat surface such that the hinge joint is dragged on the surface. The stops can also be spaced to allow a limited amount of rotation in both up and down directions. Accordingly, the vehicle can rotate about the hinge to adapt to both concave and convex surfaces. As such, the vehicle can be used on the outside of a pipe (convex surface) as well as in the inside of a tank (concave surface) without structural changes to the vehicle. The degree of freedom can permit movement in both the up and down directions, which can increase the vehicle's ability to traverse both convex surfaces (e.g., outside of a pipe) and concave surfaces (such as a tank surface). The width of the omni-wheel and the magnets that provide attractive force between the wheel and the surface help resist unwanted movement in the up and down directions. The omni-wheel, by its width and its magnets (which can provide two points of contact with the surface), is biased to be normal to the traveling surface. Accordingly, the omni-wheel itself provides a resistive force to over rotation of the vehicle about the hinge.

In addition, the hinge can have other limited degrees of freedom, which can be accomplished by incorporating some play in the hinge design. This play can improve the function of the robot as it moves along particular trajectories that induce a twisting motion between the two chassis sections, such as when the vehicle is traveling in a helical pattern around a pipe.

The robotic vehicle 810, including the orientations of its magnetic wheel and the hinged chassis, provides significant advances in mobility. It is possible to accomplish a complete 180° turn while traversing a half circle (e.g., steel pipe) that has a diameter only slightly larger than the diameter of the drive wheel. The vehicle can be used to move and carry inspection equipment. Other uses for such a vehicle having the above described chassis design can be used to move and transport goods/personnel on magnetically inducible materials, such as the steel framework of a skyscraper that is being constructed (or for inspection/maintenance after construction by providing magnetic purchase to the steel structure) or the side of a large vessel.

A vehicle as described above can transverse steel surfaces with diameters of as little as 6" and potentially even smaller, with the ability to move in any direction and to any orientation. The movement of the vehicle can include longitudinal movement, circumferential movement, helical movement, 360 degree pivoting around a fixed point. The vehicle can overcome obstacles such as welds or patches of up to at least one half inch. The vehicle is cable of performing these maneuvers on the underside of steel surfaces, including both internally within a pipe and externally on multiple structures. The vehicle can also negotiate elbows or other turns in pipes on both the convex and concave surfaces. Additionally, the vehicle, as a result of its pivoting motion, can overcome certain types of obstacles which would not be easy for a normal wheel to drive over. Accordingly, the vehicle can temporarily use the omni-wheel as the primary locomotive accessory (while the 'driving wheel' remains primarily in place). The design of the vehicle also allows the vehicle to transverse very narrow surfaces (such as the side of a beam, very small pipe, etc.) due to its in-line configuration. The minimum width of such a surface is limited only by the inner distanced between the two yokes of the magnetic driving wheel.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

The invention claimed is:

1. A robotic vehicle chassis for a two-wheeled robotic vehicle, comprising:
   a first chassis section;
   a second chassis section;
   a hinge joint connecting the first and second chassis sections such that the first and second chassis sections are capable of rotation with respect to each other in a first direction;
   a drive wheel mounted to one of the first and second chassis sections, wherein the drive wheel includes first and second drive hubs, each respective hub being located on an opposite side of the drive wheel, the first and second drive hubs being configured to rotate together or with respect to each other, and wherein the drive wheel has a curvature such that each side of the drive wheel contacts the surface at a single point located on a respective opposite side of the curvature;
   an omni-wheel mounted to the other of the first and second chassis sections; the omni-wheel being mounted at an angle orthogonal with respect to the drive wheel;
   at least a first magnet included in the drive wheel; and
   at least a second magnet included in the omni-wheel,
   wherein the at least first and second magnets maintain an attractive force between the drive wheel and the surface and the omni-wheel and the surface, respectively, wherein the surface is ferromagnetic,
   wherein the hinge joint rotates in response to the curvature of a surface the vehicle is traversing.

2. The robotic vehicle chassis of claim 1, wherein the first and second chassis sections include separate power sources and motors for driving the drive wheel and the omni-wheel separately.

3. The robotic vehicle chassis of claim 1, wherein the omni-wheel includes a first and second set of rollers located on each side of the omni-wheel such that the first and second set of rollers are located to maintain at least two points of contact with the surface.

4. The robotic vehicle chassis of claim 3, wherein the first and second set of rollers are supported by a first and second hub, respectively, where the first and second hubs of the omni-wheel include the at least first magnet.

5. The robotic vehicle chassis of claim 1, wherein the first and second drive hubs include the at least second magnet.

6. The robotic vehicle chassis of claim 5, wherein points of contact of the drive hubs are textured.

7. The robotic vehicle chassis of claim 6, wherein points of contact of the drive hubs are knurled.

8. The robotic vehicle chassis of claim 5, wherein points of contact of the drive hubs are coated.

9. The robotic vehicle chassis of claim 8, wherein points of contact of the drive hubs have a rubber coating.

10. The robotic vehicle chassis of claim 8, wherein points of contact of the drive hubs have a polyurethane coating.

11. The robotic vehicle chassis of claim 1, wherein a single power source provides power to the first and second chassis sections and motors for driving the drive wheel and the omni-wheel.

12. The robotic vehicle chassis of claim 1, wherein the first and second chassis sections are configured such that the first direction of rotation is parallel to the axis of rotation of the drive wheel.

13. The robotic vehicle chassis of claim 1, wherein the hinge joint includes at least one rotation stop.

14. A robotic vehicle chassis for a two-wheeled robotic vehicle comprising:
   a first chassis section;
   a second chassis section;
   a hinge joint connecting to the first and second chassis sections such that the first and second chassis sections are capable of rotation with respect to each other in a first direction;
   a drive wheel mounted to one of the first and second chassis sections;
   an omni-wheel mounted to the other of the first and second chassis sections; the omni-wheel being mounted at an angle orthogonal with respect to the drive wheel;
   a spring element extending between the first and second chassis section, the spring element providing a force that urges the first and second chassis sections into a normal position in which there is a zero degree of rotation between the first and second chassis sections;
   at least a first magnet included in the drive wheel; and
   at least a second magnet included in the omni-wheel,
   wherein the at least first and second magnets maintain an attractive force between the drive wheel and the surface and the omni-wheel and the surface, respectively, wherein the surface is ferromagnetic,
   wherein the hinge joint rotates in response to the curvature of a surface the vehicle is traversing.

* * * * *